March 6, 1928.

H. McALLISTER 1,661,227

UTENSIL FOR MOLDING SUGAR SWEETMEATS

Filed March 25, 1926

Inventor
H. McAllister
by Nethersten... & Co
Attys.

Patented Mar. 6, 1928.

1,661,227

UNITED STATES PATENT OFFICE.

HUGH McALLISTER, OF WISHAW, SCOTLAND.

UTENSIL FOR MOLDING SUGAR SWEETMEATS.

Application filed March 25, 1926, Serial No. 97,415, and in Great Britain April 3, 1925.

This invention relates to a device for the rapid manufacture by molding, without hand contact, of sugar sweetmeats commonly called "lollipops" that is sweetmeats each with a thin stick inserted therein for holding while wrapping in paper and thereafter during consumption.

In the accompanying drawing.

$a$ denotes a pliable sheet of rubber, in which are formed through-orifices $b$ of the size and shape of lollipops and slots $c$ for guiding the sticks. Desirably the orifices $b$ are formed in offset rows, the slots intersecting the orifices $b$ being alternately to the right and left of the orifices $b$.

Figure 1:
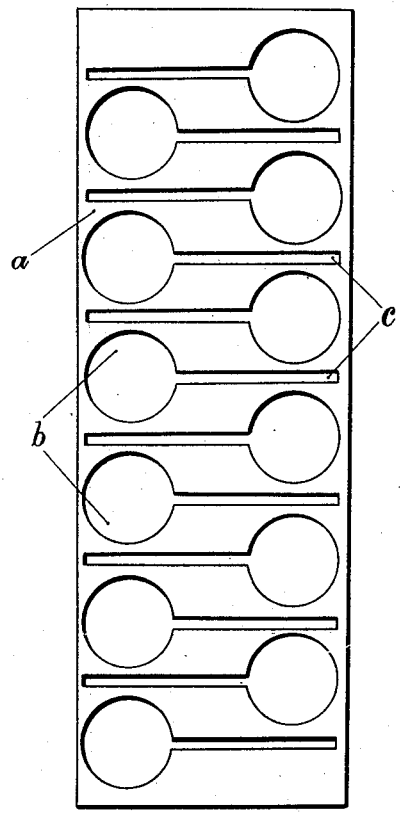
Fig. 1 is a plan view of a multi-mold device embodying the invention.
Figure 2:
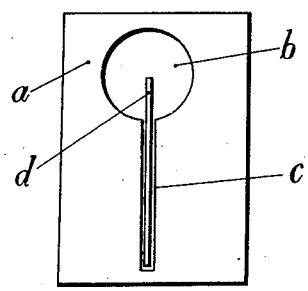
Fig. 2 is a like view of a single mold with a stick in position.
Figure 3:
Fig. 3 shows the molded product.

In practice the sheet $a$ is laid on a slab or plate. In each slot $c$ is placed a stick $d$ with one end projecting into the connected orifice $b$. Then molten cooked sugar or toffee is poured through a fondant dropper or funnel to fill each orifice. When the product is set firm, the sheet is lifted clear of the slab and the molded lollipops, each with a stick secured therein as shown in Fig. 3, are left on the slab, ready for wrapping and packing.

I claim:—

A device for the rapid manufacture of lollipops, untouched by hand, comprising a mold sheet of rubber formed with through-orifices of the size and shape of lollipops, and stick-guiding slots, one intersecting each hole.

In testimony whereof I have signed my name to this specification.

HUGH McALLISTER.